United States Patent
Masuda et al.

(10) Patent No.: US 7,880,993 B2
(45) Date of Patent: Feb. 1, 2011

(54) STORAGE DEVICE, DEFECT DETECTION METHOD AND PROGRAM FOR DETECTING DEFECT IN RECORDING MEDIUM

(75) Inventors: Setsuko Masuda, Yokohama, Kanagawa-pref (JP); Kenji Nakamura, Kanagawa (JP); Hirokazu Nakayama, Kanagawa-ken (JP); Yutaka Oishi, Kangawa (JP)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 12/136,084

(22) Filed: Jun. 10, 2008

(65) Prior Publication Data
US 2008/0310043 A1 Dec. 18, 2008

(30) Foreign Application Priority Data
Jun. 15, 2007 (JP) .............................. 2007-159126

(51) Int. Cl.
*G11B 5/09* (2006.01)

(52) U.S. Cl. ...................................................... 360/53

(58) Field of Classification Search .................. 360/53, 360/78.02, 77.12, 77.04, 78.03, 75, 69, 70, 360/71, 72.1
See application file for complete search history.

(56) References Cited

U.S. PATENT DOCUMENTS 5,099,375 A * 3/1992 Ishii et al. ................ 360/271.5
6,937,412 B1 * 8/2005 Gill et al. ...................... 360/48
7,002,465 B2 * 2/2006 Komatsu et al. ............. 340/531
2006/0007814 A1 * 1/2006 Kiyama et al. ............. 369/47.1
2009/0259918 A1 * 10/2009 Sugie et al. .................. 714/764

FOREIGN PATENT DOCUMENTS

| JP | 2007/029323 | 1/1995 |
|---|---|---|
| JP | 2007/057400 | 3/1995 |
| JP | 09147501 | 6/1997 |
| JP | 2001/119396 | 4/2001 |
| JP | 2001118342 | 4/2001 |
| JP | 2004185784 | 7/2004 |
| JP | 2004355748 | 12/2004 |
| JP | 2006/333106 | 7/2006 |

* cited by examiner

*Primary Examiner*—Fred Tzeng
(74) *Attorney, Agent, or Firm*—Anthony J. Canale (57) ABSTRACT

The present invention provides a technique for detecting a defect in a tape medium within a relatively short or narrow range. A tape defect detection device includes: a read unit for reading data from a tape medium; an error correction unit for performing error corrections for the data read by the read unit; a correction number counting unit for counting the number of the error corrections, made by the error correction unit, for each of multiple divided areas of the tape medium; a temporary storage unit for temporarily storing, for each of the areas, the number of the error corrections counted by the correction number counting unit; and a detection unit for detecting a defect in the tape medium, on the basis of a distribution of divided areas each having a larger number of error corrections than other divided areas on the tape medium.

12 Claims, 8 Drawing Sheets

STORAGE DEVICE, DEFECT DETECTION METHOD AND PROGRAM FOR DETECTING DEFECT IN RECORDING MEDIUM

BACKGROUND

The present invention relates to a technique for detecting a defect in a recording medium, and more particularly relates to a technique for detecting a defect existing in a relatively narrow range of a recording medium.

A defect in a recording medium such as, for example, a tape medium may eventually lead to loss of data. Thus, it is desirable to quickly detect the defect in order to give a user an opportunity to back up the data and to stop use of the tape medium in which the defect is found.

As a conventional technique for detecting a defect in a recording medium, there has been known a first method implemented in a tape recording apparatus that includes a data write unit which rewrites a data unit onto a tape medium when an error is detected in writing of the data unit. In the first method, the number of writes of data units is counted for each of data sets containing multiple data units, and then a tape medium is determined as having a defect if blocks containing the data sets each having a larger number of writes than a predetermined number are continuously arranged along a short-side direction of the tape medium (see Japanese Patent Application Laid-open Publication No. 2004-355748, pages 10 and 11).

Japanese Patent Application Laid-open Publication No. 2004-355748 also discloses a second method implemented in the tape recording apparatus described above. In the second method, the number of writes of data units is counted for each of data sets containing multiple data units. Then, when the number of writes of a certain data set reaches a predetermined number, the certain data set is written into an area different from an original area into which the certain data set is attempted to be written. In addition, the original area is determined as having a defect if the number of writes of the certain data set in the different area does not reach the predetermined number (see Japanese Patent Application Laid-open Publication No. 2004-355748, pages 10 and 11).

As another conventional technique for detecting a defect in a recording medium, there has also been known a method for determining quality of an information recording medium according to an error distribution. More precisely, the information recording medium contains multiple information recording tracks made by recording multiple packet data in a predetermined recording method, and the packet data are each formed of a combination of unit length data and error correction codes added thereto. In this method, when the packet data are reproduced from the information recording medium, the number of errors in each of the packet data is detected by use of the error correction code in one or more information recording tracks. Then, an error distribution is detected with the number of packet data having errors detected therein set on a vertical axis and with the number of errors detected in each packet data set on a horizontal axis. Thus, the quality of the information recording medium is determined by use of this error distribution. (see Japanese Patent Application Laid-open Publication No. Hei 9 (1997)-147501).

Meanwhile, in the above first method disclosed in Japanese Patent Application Laid-open Publication No. 2004-355748, the tape medium is determined as having a defect under the condition that the blocks containing the data sets each having a larger number of writes than the predetermined number, are continuously arranged along the short-side direction of the tape medium. Thus, in the first method described above, a defect existing in a relatively narrow range of the tape medium is overlooked since the defect does not meet the above condition.

On the other hand, in the above second method disclosed in Japanese Patent Application Laid-open Publication No. 2004-355748, the defect in the tape medium does not use the condition that the blocks containing the data sets each having a larger number of writes than the predetermined number, are continuously arranged. Thus, a defect existing in a relatively narrow range of the tape medium can be detected.

However, in the second method, when the number of writes reaches the predetermined number, the certain data set is written in the area different from the original area into which the data set has been attempted to be written, and it is determined which one of the tape medium and the data write unit has a defect, on the basis of whether or not the number of writes of the certain data set in the different area reaches the predetermined number. Thus, in the second method, what kind of a value is to be set as the predetermined number becomes a key to correct defect detection.

However, a drive usually deteriorates with its use and a rewrite attributable to deterioration of the drive may occur. Thus, when the predetermined number is set to be a fixed value, there eventually arises a situation in which the deterioration of the drive increases the number of rewrites of all the data sets up to the number close to the predetermined number even within a range of the predetermined number. In such a situation, the number of writes of a certain data set happens to exceed the predetermined number in a certain area, while the number of writes of the certain data set is less than the predetermined number in another area. Accordingly, the tape medium may be erroneously determined as having a defect. Thus, it is desirable to dynamically set the predetermined number according to the deterioration of the drive with its use. However, for the dynamic setting, a new mechanism for determining a level of deterioration of the drive is required.

Moreover, the technique disclosed in Japanese Patent Application Laid-open Publication No. Hei 9 (1997)-147501 determines whether or not there are smudges, flaws and the like on the surface of an optical card, or determines whether or not there are scratches or stains that cannot be easily removed on the surface of the optical card, on the basis of a degree of concentration in the distribution relative to the vicinity of the number of specific errors in the error distribution. In this error distribution, the number of packet data having errors detected therein is set on the vertical axis, while the number of errors detected in each packet data is set on the horizontal axis. However, in the case where there is a small defect in a relatively short or narrow range of the optical card, only a small number of packet data is detected as having an error due to the small defect. Thus, the small defect is not shown as significant data on the error distribution described above. Consequently, it is not suitable to use the error distribution described above for detecting a defect in a relatively short or narrow range of the tape medium.

Furthermore, in Japanese Patent Application Laid-open Publication No. Hei 9 (1997)-147501, a possibility of an error due to failure of the drive is not taken into consideration. Thus, the method for determining the quality of the information recording medium by use of the technique disclosed in Japanese Patent Application Laid-open Publication No. Hei 9

(1997)-147501 is a method effective when the drive is guaranteed to have no problems at all.

SUMMARY

It is an aspect of the present invention to provide a storage device, a method and a program for detecting a defect in a recording medium. Specifically, it is a main object of the present invention to provide a technique for detecting a defect in a relatively short or narrow range of a tape medium, by use of a simpler method without requiring a new mechanism for determining a level of deterioration of a drive.

The present invention for the foregoing aspect is achieved by the following storage device which reads data from a recording medium. The storage device comprises: a read unit for reading data from a recording medium; an error correction unit for performing error corrections for the data read by the read unit; a correction number counting unit for counting the number of the error corrections made by the error correction unit for each of multiple divided areas of the recording medium; a temporary storage unit for temporarily storing, for each of the multiple divided areas, the number of the error corrections counted by the correction number counting unit; and a detection unit for detecting a defect in the recording medium on the basis of a distribution of areas having a larger number of error corrections than other areas on the recording medium.

The error correction by the error correction unit may be performed by use of an error correction code added to the read data. Moreover, the detection unit detects the defect in the recording medium by detecting a situation where areas each having a larger number of the error corrections than other areas are concentrated in one or more specific positions on the recording medium. This error correction method is adopted because, when there is a defect in the storage device including the read unit, the number of the error corrections is considered to be increased in a relatively long or wide range of the recording medium.

The detection unit may use a Gini coefficient to detect the situation where areas each having a larger number of error corrections than other areas are concentrated in one or more specific positions on the recording medium.

The Gini coefficient is known as an index for analyzing and comparing inequality. The Gini coefficient takes a value in a range of 0 to 1. As the value becomes closer to 0, the difference becomes small. On the other hand, as the value becomes closer to 1, the difference becomes large. When areas each having a larger number of error corrections than other areas are concentrated in one or more specific positions on the recording medium, a difference in the number of error corrections between the areas is significantly increased. Therefore, the detection unit can detect the defect in the recording medium by determining whether or not the obtained value of the Gini coefficient is close to 1.

The recording medium may be a tape medium, and the tape medium may have multiple bands arranged along a longitudinal direction of the tape medium. Moreover, the detection unit obtains the Gini coefficient by referring to the number of the error corrections for each of the areas obtained across one or more of the bands.

Moreover, the storage device described above may further comprise a notification unit for notifying a detection result to a user of the recording medium in response to the detection of a defect in the recording medium by the detection unit. Moreover, notification of the detection result may be outputted to an output device connected to the storage device described above, or may be outputted to a host device through a network when the storage device described above has a communication function.

Moreover, the correction number counting unit may count the number of the error corrections made by the error correction unit for each of the multiple divided areas of the tape medium, which are obtained by dividing the tape medium into multiple areas in a long-side direction of the tape medium.

Furthermore, the correction number counting unit may count the number of the error corrections made by the error correction unit for each of the multiple divided areas of the tape medium, which are obtained by dividing the tape medium into multiple areas in long-side and short-side directions of the tape medium.

Moreover, the present invention for the foregoing aspect may also be achieved by the following storage device which writes data onto a recording medium. The storage device comprises: a write unit for writing data onto the recording medium; a rewrite unit for detecting a failure in writing of the data by the write unit, and for rewriting data that has failed to be written onto the recording medium; a rewrite number counting unit for counting the number of rewrites executed by the rewrite unit for each of multiple divided areas of the recording medium; a temporary storage unit for temporarily storing, for each of the multiple divided areas, the number of the rewrites counted by the rewrite number counting unit; and a detection unit for detecting a defect in the recording medium by detecting a situation where areas each having a larger number of the rewrites than other areas are concentrated in one or more specific positions on the recording medium.

Furthermore, the present invention for the foregoing aspect may be achieved by the following storage device which reads and writes data from and onto a recording medium. The storage device comprises: a read and write unit for reading and writing data from and onto the recording medium; a positioning unit for instructing the read and write unit to move relative to the recording medium; a positioning control unit for controlling the positioning unit on the basis of information read from servo tracks provided on the recording medium; a servo error detection unit for detecting errors in reading the servo tracks; an error number counting unit for counting the number of the errors in reading the servo tracks, which are detected by the servo error detection unit, for each of multiple divided areas of the recording medium; a temporary storage unit for temporarily storing, for each of the multiple divided areas, the number of the errors in reading the servo tracks, which is counted by the error number counting unit; and a detection unit for detecting a defect in the recording medium by detecting a situation where areas each having a larger number of the errors in reading the servo tracks than other areas are concentrated in one or more specific positions on the recording medium.

Note that the more concrete configuration or additional configuration described above is applicable to the storage device which writes data onto the recording medium, and in addition, the more concrete configuration or additional configuration described above is applicable to the storage device which reads and writes data from and onto the recording medium.

Although the present invention has been described above as the storage device for detecting a defect in a recording medium, the present invention can also be embodied as a method or a program for detecting a defect in a recording medium, which is executed in such a storage device, or as a storage medium storing the program therein.

BRIEF DESCRIPTION OF THE SEVERAL VIEWS OF THE DRAWINGS

For a more complete understanding of the present invention, reference is now made to the following description taken in conjunction with the accompanying drawings.

DETAILED DESCRIPTION

With reference to the drawings, an embodiment of the present invention will be described herein below. Note that the same elements are denoted by the same reference numerals throughout the description of the embodiment. Moreover, the present invention will be described below by taking, for example, a tape medium as a recording medium and a tape drive as a storage device.

Figure 1:
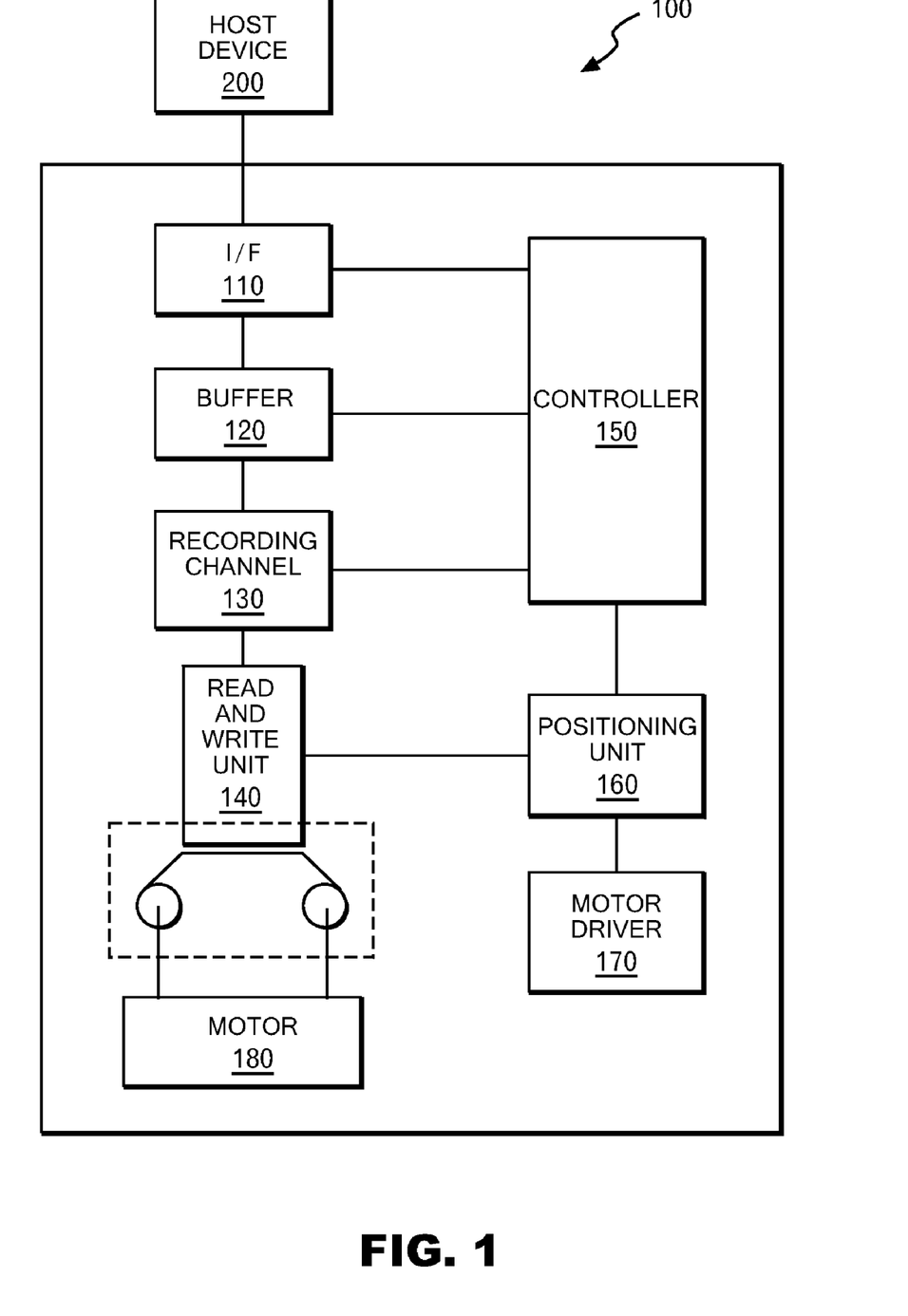
FIG. 1 is a diagram showing an example of a hardware configuration of a tape drive 100 according to an embodiment of the present invention.

FIG. 1 is a diagram showing an example of a hardware configuration of a tape drive 100 to which an embodiment of the present invention is applied. The tape drive 100 includes an interface 110, a buffer 120, a recording channel 130, a read and write unit 140, a controller 150, a positioning unit 160, a motor driver 170 and a motor 180.

The interface 110 communicates with a host device 200. For example, the interface 110 receives, from the host device 200, a write command to instruct the writing of data onto a tape medium 300. Moreover, the interface 110 receives, from the host device 200, a read command to instruct reading of data from the tape medium 300.

Note that the tape drive 100 and the host device 200 are connected to each other through a network such as a SCSI (Small Computer System Interface) and/or a LAN (Local Area Network). Moreover, the tape drive 100 and the host device 200 may be connected to each other through a network such as a dedicated line and/or the Internet. Alternatively, the tape drive 100 may also be connected to an information processor such as a personal computer through a communication interface such as the SCSI and/or the LAN and then to the host device 200 through the information processor.

The buffer 120 is a memory for temporarily storing data to be written onto the tape medium 300 and data read from the tape medium. For example, the buffer 120 is formed of a DRAM (Dynamic Random Access Memory).

The recording channel 130 is a communication path used for writing the data stored in the buffer 120 onto the tape medium 300 or for temporarily storing the data read from the tape medium 300 in the buffer 120.

The read and write unit (read and write head) 140 has a data read and write element, performs the writing of data onto the tape medium 300, and performs the reading of data from the tape medium 300. The read and write unit 140 according to this embodiment also has a servo read element, and reads signals from servo tracks provided on the tape medium 300.

The positioning unit 160 instructs the read and write unit 140 to move in a short-side direction (width direction) of the tape medium 300. The motor driver 170 drives the motor 180.

The controller 150 controls the entire tape drive 100. Specifically, the controller 150 controls the writing of data onto the tape medium 300, and controls the reading of data from the tape medium 300 according to the commands received through the interface. Moreover, the controller 150 controls the positioning unit 160 according to the signal read from the servo track. Furthermore, the controller 150 controls movement of the motor through the positioning unit 160 and the motor driver 170. Note that the motor driver 170 may be connected directly to the controller 150.

In addition to the functions described above, the controller 150 according to the embodiment of the present invention performs the detection of a defect existing in a relatively short or narrow range of the tape medium 300. This function will be described in detail with reference to FIG. 3. The controller as described above is achieved by a CPU, RAM and ROM (not shown). Here, the ROM stores programs for allowing the controller 150 to provide the foregoing functions after the tape drive 100 is started, the programs containing a boot program to be executed by the CPU when the tape drive 100 is started, and containing a tape defect detection program according to the embodiment of the present invention. Moreover, the CPU uses the RAM to execute the programs described above.

Note that, in this embodiment, description will be given by taking the tape drive 100 and the tape medium 300, which conform to the LTO (Linear Tape Open) standards, as an example. The LTO standards are open format standards jointly developed by three companies—Hewlett-Packard, IBM and Seagate (currently, Quantum).

Figure 2:
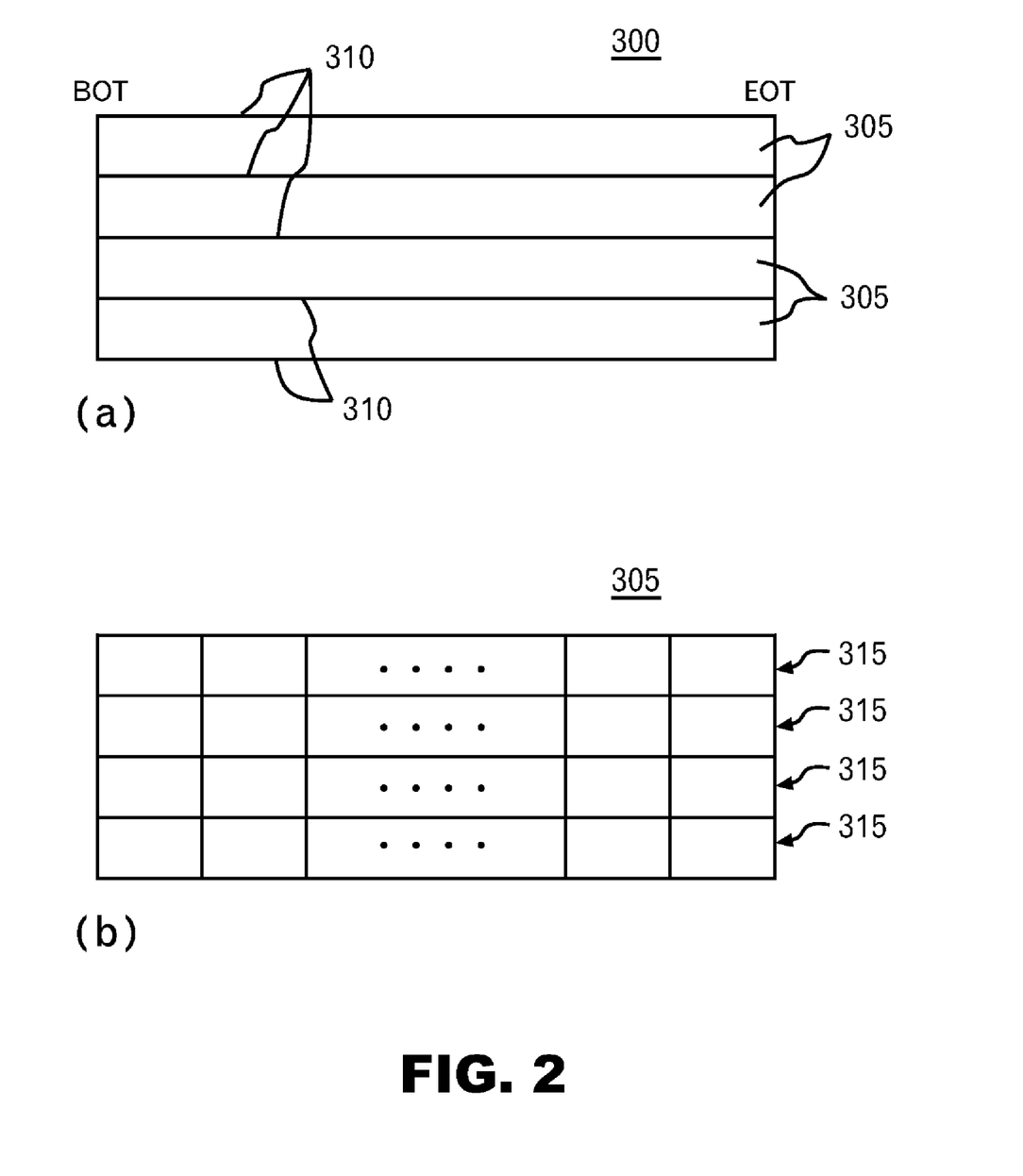
FIGS. 2(a) and 2(b) are diagrams showing an example of a configuration of a recording area in a tape medium 300 according to the embodiment shown in FIG. 1.

FIGS. 2(a) and 2(b) show an example of a configuration of a recording area in the tape medium 300 according to this embodiment. As shown in FIG. 2(a), the tape medium 300 has multiple bands 305 arranged along a longitudinal direction of the tape medium 300 between BOT (Beginning Of Tape) and EOT (End Of Tape). On both sides of each of the plurality of bands 305, servo tracks 310 for controlling a data write position or a data read position are provided along the longitudinal direction.

As shown in FIG. 2(b), each of the bands 305 has multiple data tracks 315 arranged along the longitudinal direction of the tape medium 300. Each of the data tracks 315 has multiple data sets along the longitudinal direction of the tape medium 300. Each of the data sets has multiple CQs (Codeword Quads) as an example of a data unit that is a unit of writing and reading of data.

Figure 3:
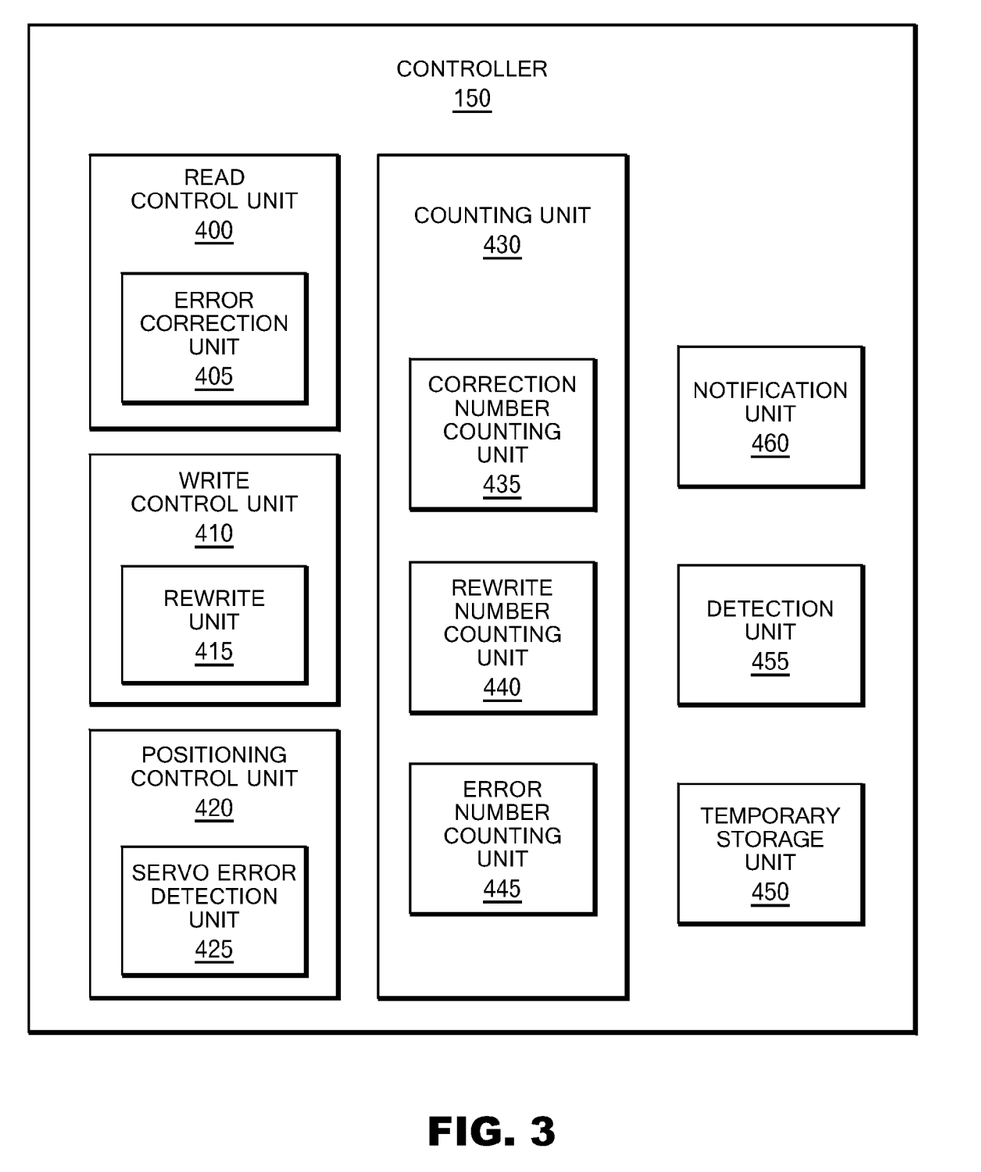
FIG. 3 is a diagram showing an example of a functional configuration of a controller 150 according to the embodiment shown in FIG. 1.

FIG. 3 is a diagram showing an example of a functional configuration of the controller 150 according to this embodiment. As described above, the controller 150 according to this embodiment performs detection of the defect existing in the relatively short or narrow range of the tape medium 300, in addition to functions of a controller in a normal tape drive. The controller 150 as described above includes a read control unit 400, a write control unit 410, a positioning control unit 420, a counting unit 430, a temporary storage unit 450, a detection unit 455 and a notification unit 460.

The read control unit 400 controls reading of data from the tape medium 300 according to the read command transmitted from the host device 200. The read control unit 400 according to this embodiment includes an error correction unit 405. The error correction unit 405 checks for errors in the data read from the tape medium 300. When the error is found, the error correction unit 405 performs an error correction, by use of an error correction code added to the data. Here, in recording of data transmitted from the host device 200 onto the tape medium 300, the tape drive 100 according to this embodiment protects the data by adding a two-dimensional ECC to user data in each of data sets 320.

Figure 4:
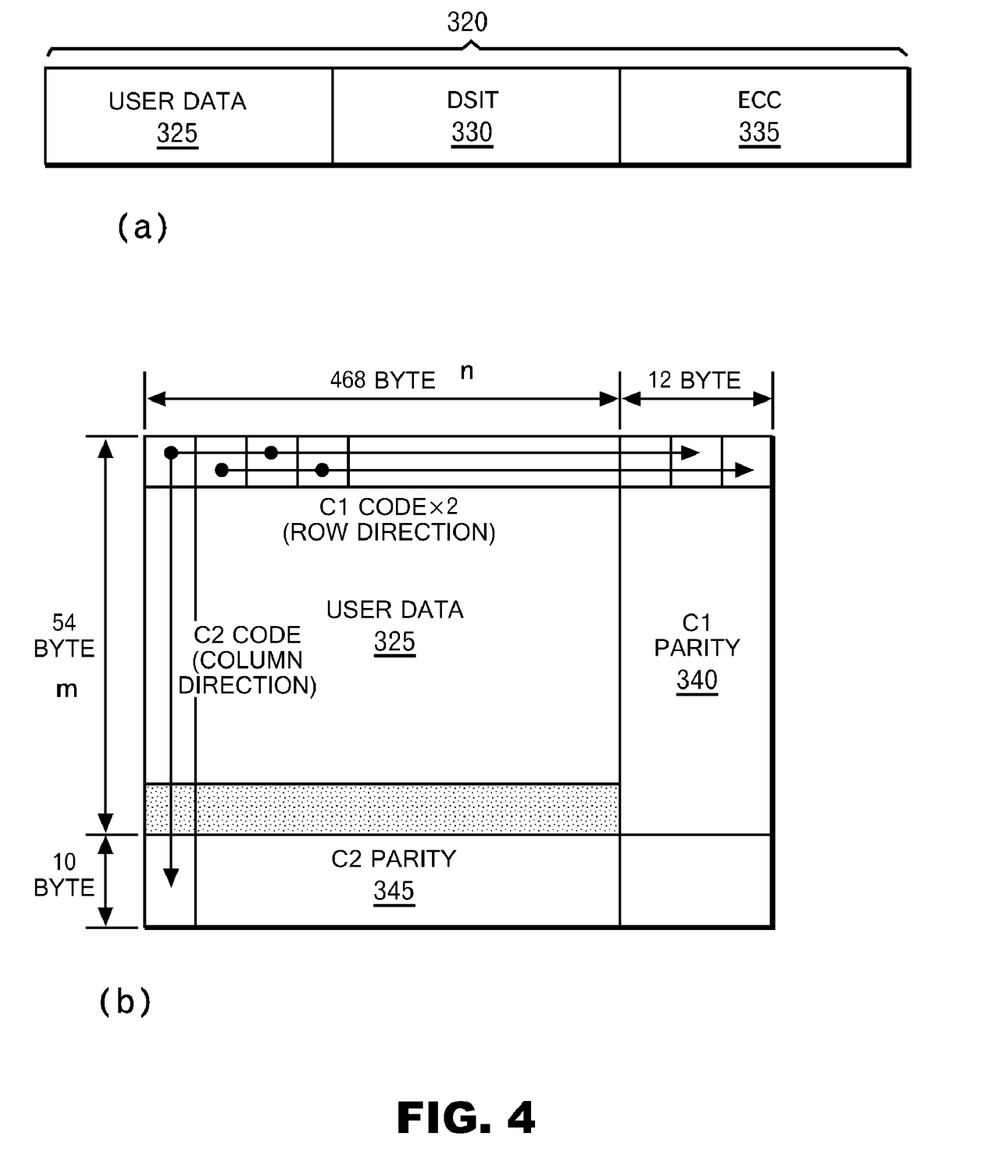
FIGS. 4(a) and 4(b) are diagrams showing an example of a structure of data recorded onto the tape medium 300 according to the embodiment shown in FIG. 1.

FIGS. 4(a) and 4(b) show a structure of data recorded onto the tape medium 300 according to this embodiment. As shown in FIG. 4(a), the data set 320 has two areas—user data 325 and a DSIT (Data Set Information Table) 330. The data transmitted from the host device 200 is recorded in the user data 325, and contents of the data area 325 are recorded in the DSIT 330. The data set 320 also has an error correction code 335.

As shown in FIG. 4(b), the error correction code 335 includes: a C1 parity 340 added in a row direction; and a C2 parity 345 added in a column direction in the user data 325 arranged in m rows×n columns. The C1 parity 340 is a parity code used for correcting an error in the row direction of the user data 325. The C1 parity 340 may include: a parity code for data made up of even-numbered bytes; and a parity code for data made up of odd-numbered bytes as shown in FIG. 4(b), for example. Moreover, the C2 parity 345 is a parity code used for correcting an error in the column direction of the user data 325.

The write control unit 410 controls the writing of data onto the tape medium 300 according to the write command transmitted from the host device 200. The write control unit 410 according to this embodiment includes a rewrite unit 415. The rewrite unit 415 reads the written data on-the-fly and verifies whether or not the data is correctly written. Here, if a failure in writing of the data is detected, in other words, if even one of the CQs included in the data set 320 that should be written cannot be read, the rewrite unit 415 rewrites the CQ. Note that, although rewriting by the rewrite unit 415 sets the number of the CQs included in the data set 320 to be variable, an upper limit thereof is set in the LTO. The number of CQs that can be rewritten is 0 at a minimum and 256 at a maximum, in the case of the third generation LTO. On the other hand, the number of CQs that can be rewritten is 0 at a minimum and 128 at a maximum, in the case of the second and first generation LTO.

The positioning control unit 420 controls the positioning unit 160 in accordance with a servo track signal read by the read and write unit 140. The positioning control unit 420 according to this embodiment includes a servo error detection unit 425. The servo error detection unit 425 detects a read error of the servo track signal for avoiding unintended overwriting or reading of data recorded on an adjacent track. For example, when the servo track signal cannot be read, a servo error is detected. Alternatively, the servo error is also detected when a track position or a tape longitudinal position cannot be found out from the servo track signal.

The counting unit 430 includes a correction number counting unit 435, a rewrite number counting unit 440 and an error number counting unit 445, and counts the number of errors detected by the read control unit 400, the write control unit 410 and the positioning control unit 420, respectively. Here, the tape medium 300 is virtually divided into multiple areas in its long-side direction, and the counting unit 430 counts the number of errors for each of the divided areas. Alternatively, the tape medium 300 is virtually divided into multiple areas in its long-side direction and in its short-side direction, while the counting unit 430 counts the number of errors for each of the divided areas. Each of the areas has a preset size. Moreover, as to the size of the area, the correction number counting unit 435, the rewrite number counting unit 440 and the error number counting unit 445 may take different values from each other or may take all the same value. The number of errors counted for each of the areas is stored in the temporary storage unit 450 in association with identification information about the area.

As an example, the entire area of the tape medium 300 is divided into 128 areas in the longitudinal direction and 64 areas in the width direction perpendicular thereto. When it is assumed that 4 bytes are required for each area, for example, in order to store the number counted by each of the counting units (435, 440 and 445), a memory of 128×64×4=32768 bytes is temporarily required. Note that data about the entire area of the tape medium 300 is not necessarily required to detect a defect in the tape medium 300. For example, data of one band 305 may be used.

The correction number counting unit 435 counts the number of error corrections made by the error correction unit 405 for each of the areas. The size of the area set for the correction number counting unit 435 may be set to be large enough to record the data set 320 that is a unit of the error correction by the error correction unit 405. Note that the correction number counting unit 435 may count the error corrections made by separating error corrections using the C1 parity 340 from error corrections using the C2 parity 345, or may count those error corrections as the same error corrections without making separation there between.

The rewrite number counting unit 440 counts the number of rewrites performed by the rewrite unit 415 for each of the areas. The size of the area set for the rewrite number counting unit 440 may be set to be large enough to record the data set 320 consisting of the CQs as a unit of rewriting by the rewrite unit 415.

The error number counting unit 445 counts the number of errors in reading the servo tracks by the servo error detection unit 425 for each of the areas. The size of the area that can be set for the error number counting unit 445 may be set to be large enough to record the data set 320 that is a unit of reading and writing.

The detection unit 455 detects a defect in the tape medium 300 on the basis of a distribution of areas each having a larger number of errors counted by the counting unit 430 than the other areas on the tape medium 300. Here, the number of errors counted by the counting unit 430 is any of the number of error corrections counted by the correction number counting unit 435, the number of rewrites counted by the rewrite number counting unit 440, and the number of errors in reading the servo tracks, which number is counted by the error number counting unit 445. Hereinafter, detection processing by the detection unit 455 will be described in detail by taking the number of error corrections counted by the correction number counting unit 435 as an example of the number of errors.

To be more specific, the detection unit 455 detects a defect in the tape medium 300 by detecting a situation where areas each having a larger number of error corrections than other areas are concentrated in one or more specific positions on the tape medium 300. The detection unit 455 according to this embodiment detects such a situation by use of a Gini coefficient known as an index for analyzing and comparing inequality.

As described above, the Gini coefficient takes a value in a range of 0 to 1. As the value becomes closer to 0, the difference becomes small. On the other hand, as the value becomes closer to 1, the difference becomes large. When areas each having a larger number of error corrections than other areas are concentrated in one or more specific positions on the tape medium 300, a difference in the number of error corrections between the areas is significantly increased. Thus, the Gini coefficient shows a value close to 1. Therefore, the detection unit 455 calculates the Gini coefficient on the basis of the following formula and determines whether or not the calculated value is close to 1.

$$G = \frac{1}{n}\left(n+1 - 2\frac{\sum_{i=1}^{n}(n+1-i)X_i}{\sum_{i=1}^{n}X_i}\right)$$ Formula 1

Here, X is the number of error corrections for each area, and n is the number of the divided areas. Note that the number of error corrections for the entire area of the tape medium 300 is not necessarily required to calculate the Gini coefficient. For example, the detection unit 455 may calculate the Gini coefficient by referring to the number of error corrections for each of the areas obtained across one of the bands 305.

In response to the detection of the defect in the tape medium 300 by the detection unit 455, the notification unit 460 notifies the detection result to a user of the tape medium 300. As an example, in the case where the tape drive 100 is connected to an output device such as a display and a printer, the notification unit 460 outputs the detection result to the output device. Alternatively, the notification unit 460 may notify the detection result to the host device 200 through the interface 110.

As described above, the tape drive 100 according to the embodiment of the present invention counts the number of various errors for each of the virtually divided areas of the tape medium 300 and detects a defect in the tape medium 300 on the basis of a distribution of areas each having a larger number of errors counted than the other areas on the tape medium 300. Thus, even if the tape drive 100 deteriorates with use while errors caused by the deterioration are included in the number of errors to be counted, the tape drive 100 according to the embodiment of the present invention determines whether or not there is a defect on the basis of a relative number of errors. Thus, the defect in the tape medium 300 can be correctly detected.

Moreover, even if there is a defect in the tape drive 100, such as the read and write unit 140, and various errors are detected and counted due to the defect, the tape drive 100 according to the embodiment of the present invention determines whether or not there is a defect on the basis of a distribution of areas each having a larger number of errors on the tape medium 300. Thus, the defect in the tape medium 300 can be correctly detected by differentiating the defect from the defect in the tape drive 100.

Figure 5:
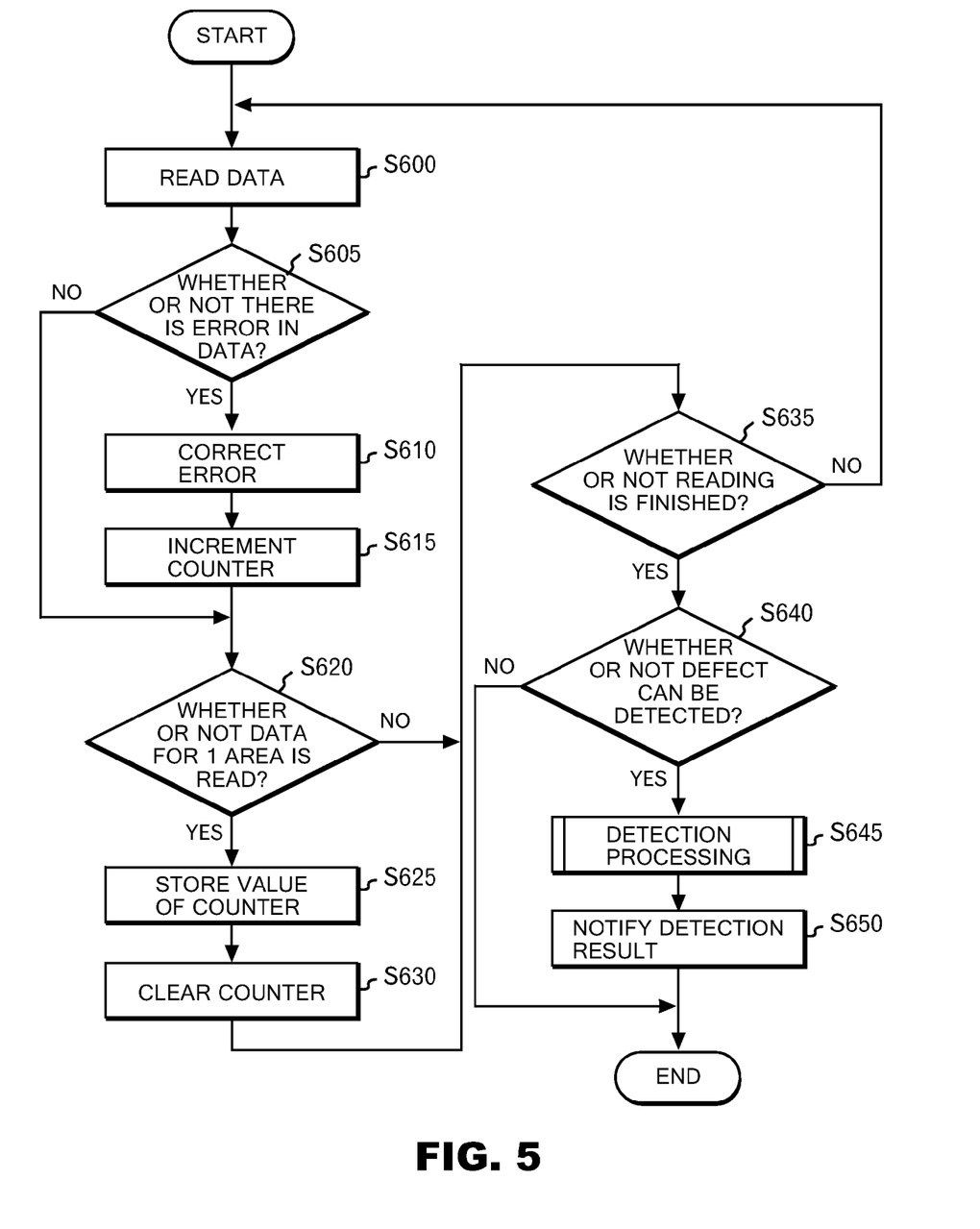
FIG. 5 is a flowchart showing an example of a flow of first detection processing for a defect in the tape medium 300 by use of the number of error corrections.

Next, with reference to flowcharts shown in FIGS. 5 to 8, operations of the tape drive 100 according to this embodiment will be described. FIG. 5 shows an example of a flow of first detection processing for a defect in the tape medium 300 by use of the number of error corrections in reading of data. Note that it is assumed that the tape medium 300 is virtually divided into multiple areas beforehand, and the size of the virtually divided areas is stored in a ROM included in the controller 150, for example. Moreover, a minimum data amount required to detect a defect in the tape medium 300 is also previously stored in the ROM.

The processing starts from Step 600 where the tape drive 100 reads data by the data set 320 from the tape medium 300, in accordance with the read command from the host device 200. Thereafter, the tape drive 100 verifies whether or not there is an error in the data for each of the data sets 320 (Step 605). If YES in Step 605, in other words, if the error is found, the tape drive 100 corrects the error by use of an error correction code added to the data set 320 (Step 610) and increments a counter (Step 620).

Meanwhile, if NO in Step 605, in other words, if no error is found, the processing moves from Step 615 to Step 620 where the tape drive 100 determines whether or not data for one area is read, on the basis of the size of the area stored in the ROM. If the data for one area is read (Step 620: YES), the tape drive 100 stores a value of the counter in the temporary storage unit 450 in association with identification information about the area (Step 625), and clears the counter (Step 630).

Meanwhile, if NO in Step 620, in other words, if the data for one area is not yet read, the processing moves from Step 630 to Step 635 where the tape drive 100 determines whether or not reading of data instructed by the host device 200 is finished. If there is still left data to be read (Step 635: NO), the processing returns to Step 600 where the tape drive 100 reads the next data set 320 from the tape medium 300.

Meanwhile, if YES in Step 635, in other words, if all the data instructed by the host device 200 is read, the tape drive 100 next determines, on the basis of the minimum data amount stored in the ROM, whether or not data on the number of error corrections is collected as much as to enable detection of a defect in the tape medium 300 (Step 640). If the data on the number of error corrections is not collected as much as to enable the detection of the defect in the tape medium 300 (Step 640: NO), the processing ends.

Meanwhile, if YES in Step 640, in other words, if the data on the number of error corrections is collected as much as to enable the detection of the defect in the tape medium 300, the tape drive 100 executes detection processing for detecting the defect in the tape medium 300 (Step 645). The detection processing will be described in detail later with reference to FIG. 6. Thereafter, the tape drive 100 notifies the detection result (Step 650), and the processing ends.

Figure 6:
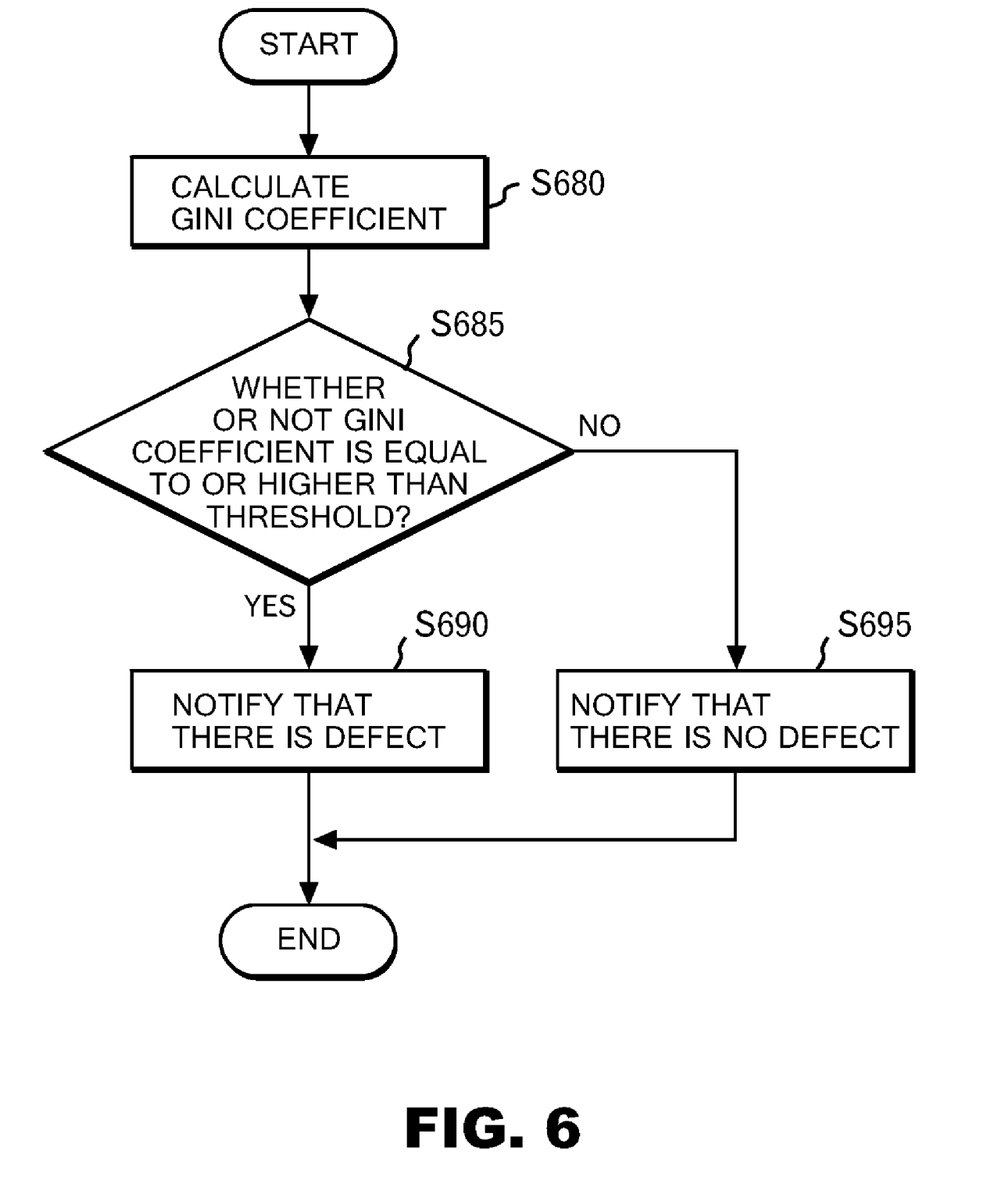
FIG. 6 is a flowchart showing an example of a flow of detection processing by a detection unit 455 according to the embodiment shown in FIG. 1.

FIG. 6 shows an example of a flow of the detection processing by the detection unit 455 in the controller 150. The processing starts from Step 680 where the detection unit 455 calculates a Gini coefficient by reading the number of error corrections for each area from the temporary storage unit 450. Thereafter, the detection unit 455 determines whether or not the calculated Gini coefficient is equal to or higher than a predetermined threshold (Step 685). Here, the predetermined threshold is a value close to 1, for example, 0.8. The value of the threshold to be set depends on: a granularity of defect to be detected in the tape medium; a size of the virtually divided areas; and the number of the divided areas. By reducing the size of the virtually divided areas to increase the number thereof, the threshold is set to the value close to 1 to enable detection of a defect having a smaller granularity. Meanwhile, in this case, since the calculation amount is increased, the threshold is set by comprehensive determination.

If YES in Step 685, in other words, if the calculated Gini coefficient is equal to or higher than the predetermined threshold, the detection unit 455 determines that there is a defect in the tape medium 300, and notifies the notification unit 460 to that effect (Step 690). Meanwhile, if NO in Step 685, in other words, if the calculated Gini coefficient is smaller than the predetermined threshold, the detection unit 455 determines that there is no defect in the tape medium 300, and notifies the notification unit 460 to that effect (Step 695). This step is taken because of the following reason. Specifically, the Gini coefficient which is smaller than the predetermined threshold means that there is not much difference in the number of error corrections between the areas. Therefore, even if there are a large number of error corrections to be counted, such a phenomenon is observed in the areas within a relatively long or wide range. Thus, in such a case, it is possible to determine that there is a defect in the tape drive 100. The processing ends after Step 690 or Step 695.

Figure 7:
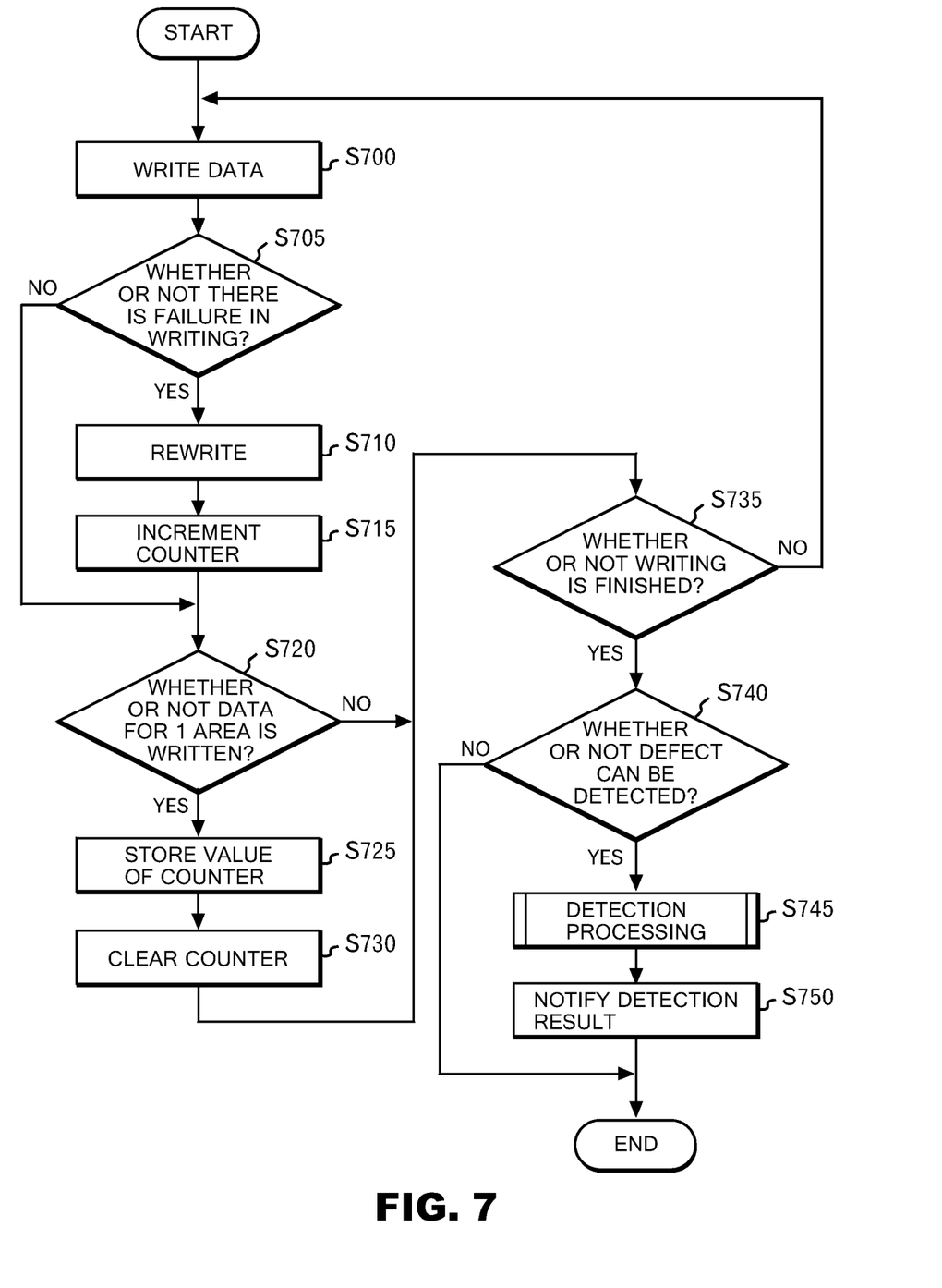
FIG. 7 is a flowchart showing an example of a flow of second detection processing for the defect in the tape medium 300 by use of the number of rewrites.

Next, description will be given of processing of detecting a defect in the tape medium 300 by use of the number of data rewrites in writing of data. FIG. 7 shows an example of a flow of second detection processing for the defect in the tape medium 300, by use of the number of data rewrites in writing of data. Note that this processing is basically the same as the first detection processing for the defect in the tape medium 300, which has been described with reference to FIGS. 5 and 6. Thus, here, only steps in the processing (from Step 700 to Step 720 in FIG. 7) different from the first detection processing will be described.

The processing starts from Step 700 where the tape drive 100 writes data in units of CQs onto the tape medium 300, in accordance with the write command from the host device 200. Thereafter, the tape drive 100 reads the written CQs to verify whether or not the data is correctly written, in other words, whether or not there is a failure in writing of the data (Step 705). If YES in Step 705, in other words, if the failure in writing of the data is detected, the tape drive 100 rewrites the CQ (Step 710), and increments a counter (Step 715).

Meanwhile, if NO in Step 705, in other words, if there is no failure in writing of the data, the processing moves from Step 715 to Step 720. In Step 720, the tape drive 100 determines whether or not data for one area is written, on the basis of the size of the area stored in the ROM. Note that, since respective steps after Step 720 are the same as those (from Step 625 to Step 650 in FIG. 5 and FIG. 6) in the first detection processing for the defect in the tape medium 300, which has been described with reference to FIGS. 5 and 6, as described above, description thereof will be omitted.

Figure 8:
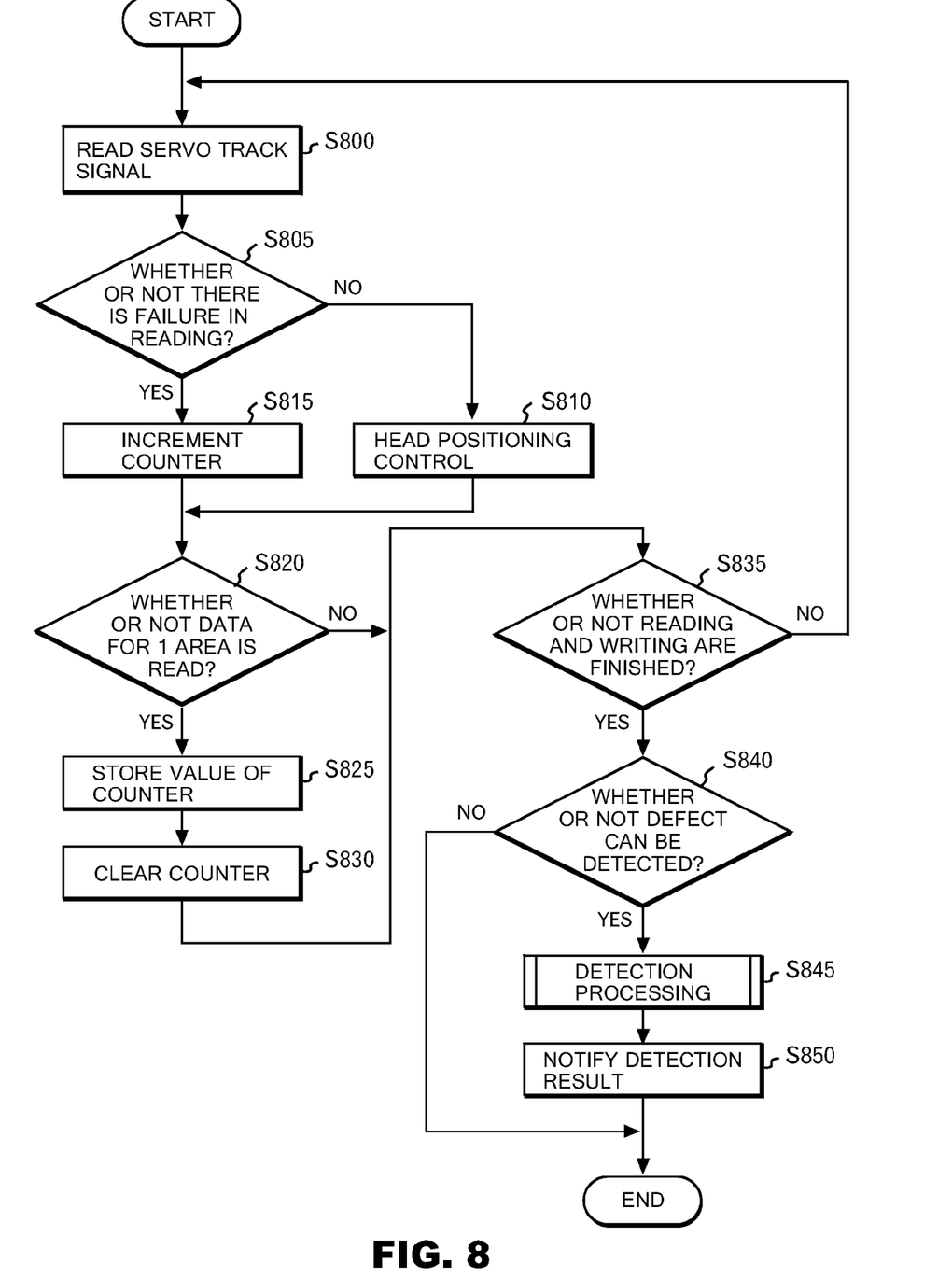
FIG. 8 is a flowchart showing an example of a flow of third detection processing for the defect in the tape medium 300 by use of the number of errors in reading servo tracks.

Next, description will be given of processing of detecting a defect in the tape medium 300 by use of the number of errors in reading servo tracks at the time of reading servo track signals. FIG. 8 shows an example of a flow of third detection processing for the defect in the tape medium 300, by use of the number of errors in reading servo tracks at the time of reading servo track signals. Note that this processing is basically the same as the first detection processing for the defect in the tape medium 300, which has been described with reference to FIGS. 5 and 6. Thus, here, only steps in the processing (from Step 800 to Step 820 in FIG. 8) different from the first detection processing will be described.

The processing starts from Step 800 where the tape drive 100 reads a signal from the servo track provided on the tape medium 300 in writing or reading of data. Thereafter, the tape drive 100 verifies whether or not the servo track signal is properly read, in other words, whether or not there is a failure in reading of the servo track signal (Step 805). If NO in Step 805, in other words, if the servo track signal is properly read, the tape drive 100 positions the read and write unit 140 at a proper position in the width direction of the tape medium 300, on the basis of the read servo track signal (Step 810).

Meanwhile, if YES in Step 805, in other words, if the failure in reading of the servo track signal is detected, the operation of reading and writing the data is suspended to perform again the operation of attempting to read the servo track signal, and the tape drive 100 increments a counter by 1 (Step 815). Thereafter, the processing moves from Step 810 or Step 815 to Step 820 where the tape drive 100 determines whether or not servo track signals for one area are read, on the basis of the size of the area stored in the ROM. Note that, since respective steps after Step 820 are the same as those (from Step 625 to Step 650 in FIG. 5 and FIG. 6) in the first detection processing for the defect in the tape medium 300, which has been described with reference to FIGS. 5 and 6, as described above, description thereof will be omitted.

Although the present invention has been described above by use of the embodiment, the technical scope of the present invention is not limited to that described in the foregoing embodiment. It is apparent to those skilled in the art that various changes or modifications can be added to the foregoing embodiment. Therefore, as a matter of course, embodiments to which such changes or modifications are added can also be included in the technical scope of the present invention.

For example, the present invention is also applicable even if the recording medium is a magnetic disk, an optical disk, a magneto-optical disk and the like. In this case, the unit area in which the number of errors is counted by the counting unit 430 is determined in the following manner. Specifically, in the case of a disk-shaped recording medium such as a Digital Video Disc (DVD), the recording medium is virtually divided in a concentric and radial pattern. Thereafter, errors are counted in each of divided areas and degrees of distribution and concentration of the errors are obtained. Accordingly, a defect in the recording medium is detected by making determination on the basis of the obtained degrees. However, in the case of the disk-shaped recording medium, information recording density varies between an inner circumferential portion and an outer circumferential portion, while a relationship between a size of physical damage, such as fingerprints and scratches, and an amount of recorded data varies. Thus, there is no point in counting the errors by treating all the tracks the same. Therefore, in the case of the disk-shaped recording medium, it is preferable that several adjacent tracks be grouped as a unit, and errors be counted by the unit of the grouped tracks, so as to obtain degrees of distribution and concentration of the errors. It is more preferable that grouping be defined so that grouped areas slightly overlap with each other.

Moreover, in the above embodiment, the Gini coefficient is used to detect the situation where areas each having a larger number of errors than other areas are concentrated in one or more specific positions on the recording medium. However, a method for detecting such a situation is not limited to the method using the Gini coefficient. An example of possible methods is as follows. Firstly, data on the numbers of the errors counted are rearranged in ascending order or in descending order. Then, a reference number of errors is obtained. Here, the reference number is, for example, one-fifth of the sum of the maximum number and the minimum number of errors. Thereafter, a counting point indicating or first falling below the reference number is found. Finally, obtained is a proportion of the sum of the numbers of errors in the counting points between the counting point of the maximum number of errors and the found counting point, with respect to the total number of errors in all the counting points. In this case, when the minimum number of errors shows a relatively large value due to deterioration of the drive, the deterioration of the drive may be erroneously determined as a defect in the recording medium. Thus, in order to prevent such erroneous detection, it is preferable to provide a threshold for the minimum number of errors, and to determine that there is deterioration in the drive when the minimum number of errors is smaller than the threshold.

According to the present invention, a defect in a relatively narrow range of a recording medium can be detected without requiring a new mechanism for determining a level of deterioration of a drive and by distinguishing the defect from a defect in the drive.

Although embodiments of the present invention have been described in detail, it should be understood that various changes, substitutions and alterations can be made therein without departing from spirit and scope of the invention as defined by the appended claims.

The invention claimed is:

1. A storage device which reads data from a recording medium, the storage device comprising:
   a read unit for reading data from the recording medium;
   an error correction unit for executing error corrections for the data read by the read unit;
   a correction number counting unit for counting the number of the error corrections made by the error correction unit for each of a plurality of divided areas of the recording medium;
   a temporary storage unit for temporarily storing, for each of the plurality of divided areas of the recording medium, the number of the error corrections counted by the correction number counting unit; and
   a detection unit for detecting a defect in the recording medium by detecting a situation where divided areas each having a larger number of the error corrections than other divided areas are concentrated in one or more specific positions on the recording medium.

2. The storage device according to claim 1, wherein the detection unit uses a Gini coefficient to detect the situation where the divided areas each having a larger number of the error corrections than the other divided areas are concentrated in one or more specific positions on the recording medium.

3. The storage device according to claim 2, wherein the recording medium comprises a tape medium, the tape medium comprises a plurality of bands arranged along a longitudinal direction of the tape medium, and the detection unit obtains the Gini coefficient by referring to the number of the error corrections for each of the divided areas obtained across at least one of the bands.

4. The storage device according to claim 1, further comprising:
   a notification unit for making a notification of a detection result to a user of the recording medium in response to the detection of a defect in the recording medium by the detection unit.

5. The storage device according to claim 1, wherein the recording medium comprises a tape medium, and the correction number counting unit counts the number of the error corrections made by the error correction unit for each of the divided areas of the tape medium, the divided areas arranged in a long-side direction of the tape medium.

6. The storage device according to claim 1, wherein the recording medium comprises a tape medium, and the correction number counting unit counts the number of the error corrections made by the error correction unit for each of the divided areas of the tape medium, the divided areas arranged in long-side and short-side directions of the tape medium.

7. A storage device which writes data onto a recording medium, the storage device comprising:
   a write unit for writing data onto the recording medium;
   a rewrite unit for detecting a failure in writing of the data by the write unit, and for rewriting data that has failed to be written onto the recording medium;
   a rewrite number counting unit for counting the number of rewrites executed by the rewrite unit for each of a plurality of divided areas of the recording medium;
   a temporary storage unit for temporarily storing, for each of the plurality of divided areas, the number of the rewrites counted by the rewrite number counting unit; and
   a detection unit for detecting a defect in the recording medium by detecting a situation where divided areas each having a larger number of the rewrites than other divided areas are concentrated in one or more specific positions on the recording medium.

8. A method of detecting a defect in a recording medium, the method comprising:
   reading data from the recording medium;
   executing error corrections for the read data;
   counting the number of the error corrections for each of a plurality of divided areas of the recording medium;
   temporarily storing, for each of the plurality of divided areas, the counted number of the error corrections in a temporary storage unit; and
   detecting a defect in the recording medium by detecting a situation where divided areas each having a larger number of the error corrections than other divided areas are concentrated in one or more specific positions on the recording medium.

9. The defect detection method according to claim 8, wherein a Gini coefficient is used in the step of detecting the defect.

10. A method of detecting a defect in a recording medium, the method comprising:
    writing data onto the recording medium;
    rewriting data that has failed to be written onto the recording medium when detecting a failure in writing of the data;
    counting the number of rewrites for each of a plurality of divided areas of the recording medium;
    temporarily storing, for each of the plurality of divided areas, the number of the rewrites counted in a temporary storage unit; and
    detecting a defect in the recording medium by detecting a situation where divided areas each having a larger number of the rewrites than other divided areas are concentrated in one or more specific positions on the recording medium.

11. A defect detection program for detecting a defect in a recording medium, the program is executed in a storage device having a controller, the program allowing the controller to execute the steps of:
    reading data from the recording medium;
    executing error corrections for the read data;
    counting the number of the error corrections for each of a plurality of divided areas of the recording medium;
    temporarily storing, for each of the plurality of divided areas, the counted number of the error corrections in a temporary storage unit; and
    detecting a defect in the recording medium by detecting a situation where divided areas each having a larger number of the error corrections than other divided areas are concentrated in one or more specific positions on the recording medium.

12. The defect detection program according to claim 11, wherein a Gini coefficient is used to detect the situation where the divided areas each having a larger number of the error corrections than the other divided areas are concentrated in one or more specific positions on the recording medium.

* * * * *